(12) United States Patent
Huang et al.

(10) Patent No.: US 10,747,781 B2
(45) Date of Patent: Aug. 18, 2020

(54) DETERMINATION OF DATA PARTITION (71) Applicant: International Business Machines Corporation, Armonk, NY (US)

(72) Inventors: Jian Chang Huang, Beijing (CN); Lei Li, Beijing (CN); Xin Sheng Mao, Beijing (CN); Jia Tan, Beijing (CN); Ya Xin Wu, Beijing (CN)

(73) Assignee: International Business Machines Corporation, Armonk, NY (US)

(*) Notice: Subject to any disclaimer, the term of this patent is extended or adjusted under 35 U.S.C. 154(b) by 218 days.

(21) Appl. No.: 15/933,469

(22) Filed: Mar. 23, 2018

(65) Prior Publication Data

US 2018/0218059 A1    Aug. 2, 2018

Related U.S. Application Data

(63) Continuation of application No. 14/805,622, filed on Jul. 22, 2015, now Pat. No. 10,019,504.

(30) Foreign Application Priority Data

Jul. 31, 2014    (CN) .......................... 2014 1 0374827

(51) Int. Cl.
    *G06F 7/02*         (2006.01)
    *G06F 16/00*        (2019.01)
    (Continued)

(52) U.S. Cl.
    CPC ............ *G06F 16/278* (2019.01); *G06F 16/21* (2019.01); *G06F 16/2228* (2019.01); *G06F 16/2282* (2019.01)

(58) Field of Classification Search
CPC ....... G06F 17/305784; G06F 17/30289; G06F 17/30321; G06F 17/30327; G06F 17/30339; G06F 3/067; G06F 2212/1016; G06F 16/2228; G06F 16/2282; G06F 16/21; G06F 16/278
See application file for complete search history.

(56) References Cited

U.S. PATENT DOCUMENTS

| 6,055,539 A | 4/2000 | Singh et al. |
| 6,625,611 B1* | 9/2003 | Teig ..................... G06F 30/398 |
| | | 716/115 |

(Continued)

FOREIGN PATENT DOCUMENTS

| CN | 101876983 B | 11/2010 |
| CN | 102156759 B | 8/2011 |

(Continued)

OTHER PUBLICATIONS

IBM Appendix P, "List of IBM Patents or Patent Applications to Be Treated As Related", Dated Mar. 23, 2018, 2 pages.

(Continued)

*Primary Examiner* — Bruce M Moser
(74) *Attorney, Agent, or Firm* — Isaac J. Gooshaw; Christopher M. Pignato (57) ABSTRACT

Partitioning a set of data using a binary format to more evenly distribute data values across a set of data partitions. By using a system of matching binary indices in a "back to front" manner, data values stored in or associated with data partitions are more evenly balanced.

18 Claims, 6 Drawing Sheets

(51) Int. Cl.
*G06F 16/27* (2019.01)
*G06F 16/21* (2019.01)
*G06F 16/22* (2019.01)

(56) References Cited

U.S. PATENT DOCUMENTS

| | | | |
|---|---|---|---|
| 8,078,825 | B2 | 12/2011 | Oreland et al. |
| 8,285,711 | B2 | 10/2012 | Bordawekar et al. |
| 8,364,677 | B2 | 1/2013 | Brodfuehrer et al. |
| 2010/0192148 | A1 | 7/2010 | Chen et al. |
| 2011/0258190 | A1* | 10/2011 | Chen .................. G06F 16/355 707/737 |
| 2012/0005418 | A1 | 1/2012 | Ribeiro et al. |
| 2013/0159659 | A1 | 6/2013 | Gelman et al. |
| 2013/0204902 | A1 | 8/2013 | Wang et al. |
| 2014/0032605 | A1 | 1/2014 | Aydin et al. |
| 2014/0067810 | A1 | 3/2014 | Wisnovsky |
| 2014/0214767 | A1 | 7/2014 | Graefe et al. |
| 2016/0034551 | A1 | 2/2016 | Huang et al. |

FOREIGN PATENT DOCUMENTS

| | | |
|---|---|---|
| CN | 102521334 B | 6/2012 |
| CN | 105335411 A | 2/2016 |

OTHER PUBLICATIONS

"Data partitioning across multiple partitions", IBM Knowledge Center, Printed on: Apr. 22, 2015, 1 page, <http://www-01.ibm.com/support/knowledgecenter/api/content/nl/en-us . . . >.

Wang, P.,"An In-Depth Analysis of Concurrent B-Tree Algorithms," Massachusetts Institute of Technology, AD-A232287, Feb. 1991, 132 pages.

Shunbin, Y., "Study on Performance Tuning of Spatial Analysis Based on Oracle Spatial", Forest Resource Management, Feb. 2007, No. 1, 4 pages, English Abstract.

* cited by examiner

DETERMINATION OF DATA PARTITION

BACKGROUND

The present invention relates to the field of data processing technology and more specifically to determining a data partition by using binary code matching to perform data processing.

Currently, due to the expansion of massive data applications, when using data enterprises, customers are not satisfied with data traditionally stored by a single server or hard disk. During the process of processing and analyzing massive data, data must be partitioned for storage to improve processing efficiency and to optimize resource configuration. The speed of data processing can be improved by splitting a larger data table into smaller, individual data tables or data information for storage, because only a fraction of data then needs to be scanned instead of all the data. Meanwhile, operations such as data maintenance, index building, backup and the like can be run more quickly.

Methods in the art for partitioning data mainly include horizontal partitioning and vertical partitioning from the perspective of partitioning direction. Horizontal partitioning divides a data table into multiple tables, with each table containing the same number of data columns, but fewer data rows. For example, a data table containing one million rows (containing all data for one year) may be divided into 12 smaller tables by horizontal partitioning, with each smaller table containing data information for one month in the year (with same number of columns but fewer rows). Any query requiring data for any specific month in that year may be performed only on a certain smaller table without performing full data scan on the large data table. Accordingly, vertical partitioning means that smaller tables contain the same number of data rows but fewer data columns, which also can achieve a similar effect as horizontal partitioning.

From the perspective of specific partitioning criterion, existing data partitioning includes list partitioning, hash partitioning, range partitioning, etc. List partitioning means that data partitioning is performed according to data values. For example, regional data may be partitioned so that data for an east region is divided into one data partition, and data for a west region is divided into one data partition. Range partitioning means that data partitioning is performed according to a range of data value. For example, data from January to March is divided into one partition, data from April to June is divided into one partition, and so on. It is not possible to determine data volume distributed in each range or enumerated value, list partitioning and range partitioning are prone to cause imbalance in data volume among various data partitions. Hash partitioning means that data partition is determined through a hash function value. Although hash partitioning can make division of data balanced, it is difficult to select an appropriate hash function, and hash partitioning will cause difficulty in migration of existing data.

SUMMARY

According to an aspect of the present invention, there is a method, computer program product, and/or system that performs the following steps (not necessarily in the following order): receive a partition key value that (i) corresponds to a data value and (ii) is expressed in a binary format; determine a data partition, wherein a data partition identification corresponding to the data partition correlates to the partition key value; determine a leaf node corresponding to the data partition; add two child leaf nodes below the leaf node, wherein the two child leaf nodes correspond to two new data partitions respectively; redistribute to one of the two new data partitions a subset of the set of data values previously distributed to the data partition; and process the data value using the data partition.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Partitioning a set of data using a binary format to more evenly distribute data values across a set of data partitions. By using a system of matching binary indices in a "back to front" manner, data values stored in or associated with data partitions are more evenly balanced.

In view of problems in the prior art, one objective of embodiments of the present invention is to provide data processing that can make data partitions balanced. A further objective of the present invention is to provide for dynamical and convenient adjustment of existing data partitions and migration of data according to changes in data distribution and data volume. These objectives are not necessarily achieved at the same time, rather, in some embodiments of the present invention only one or more of them may be achieved.

According to one aspect of the present invention, a method for data processing is provided, comprising: obtaining binary code of a partition key value of data to be processed; determining a respective data partition according to the obtained binary code of the partition key value, wherein a binary code corresponding to the respective data partition is the same as a code formed by taking same number of bits as the binary code in a back-to-front order from the obtained binary code of the partition key value; and processing the data to be processed according to the determined respective data partition.

According to another aspect of the present invention, a system for data processing is provided, comprising: an obtaining means configured to obtain binary code of a partition key value of data to be processed; a matching means configured to determine a respective data partition according to the obtained binary code of the partition key value, wherein a binary code corresponding to the respective data partition is the same as a code formed by taking same number of bits as the binary code in a back-to-front order from the obtained binary code of the partition key value; and a processing means configured to process the data to be processed according to the determined respective data partition.

According to some embodiments of the present invention, data partitions are made more balanced and/or existing data partitions are adjusted dynamically and conveniently and/or migration operations are performed on existing data in accordance with changes in real-time data distribution characteristics.

Some embodiments will be described in more detail with reference to the accompanying drawings, in which some embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
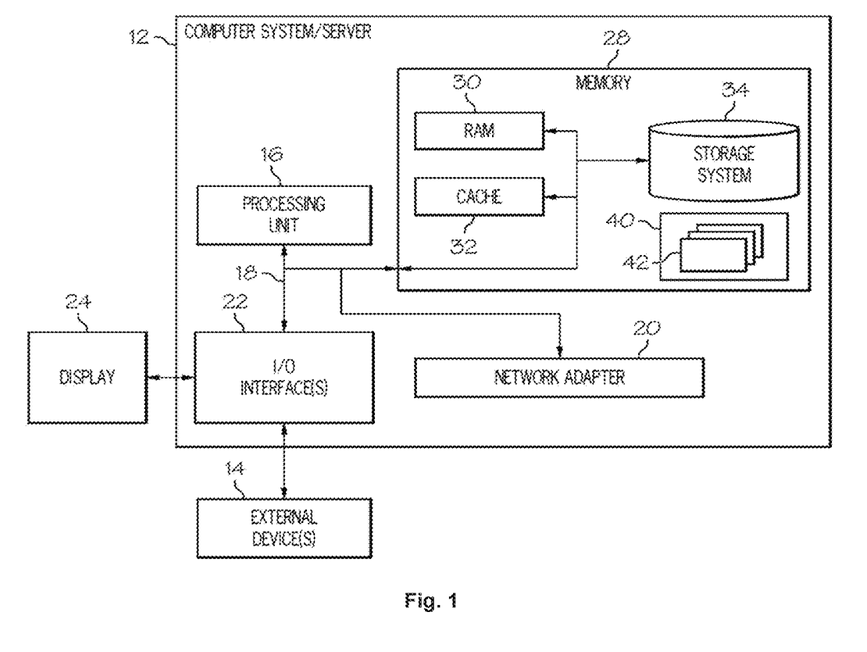
FIG. 1 shows a block diagram of a computer system/server 12 which is applicable to implement embodiments of the present invention.

Referring now to FIG. 1, in which a block diagram of a computer system/server 12 which is applicable to implement some embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (i.e., at least one) of program modules that are configured to carry out the functions of some embodiments of the invention.

Program/utility 40, having a set (at least one) of program modules 42, may be stored in memory 28, by way of example and not limitation, as well as in an operating system, one or more application programs, other program modules, and/or program data. Each of the operating system, one or more application programs, other program modules, program data, or some combination thereof may include an implementation of a networking environment. Program modules 42 generally carry out the functions and/or methodologies of some embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and/or data archival storage systems, etc.

Figure 2:
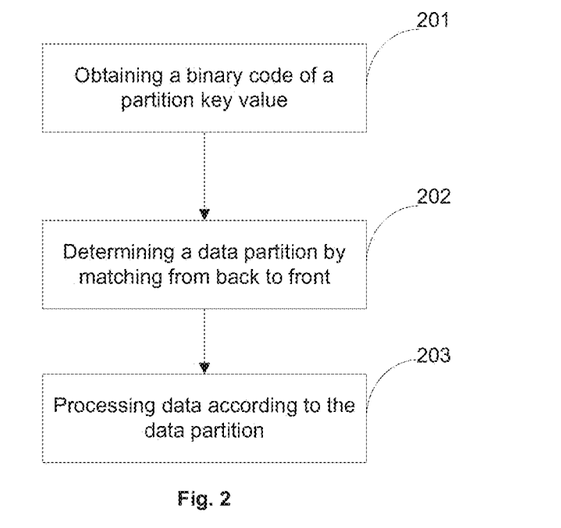
FIG. 2 shows a flowchart of a method for data processing according to embodiments of the present invention.

Before describing FIG. 2, first, an idea inherent to some embodiments of the present invention is generally introduced. The present invention takes into consideration that with respect to data, specific values thereof may be very unbalanced. For example, in an order management data table, order prices for most data records may be larger than 1000 Yuan, while order prices for a small fraction of data records are less than 1000 Yuan. Similarly, binary codes for these order prices are naturally unbalanced, for example, binary codes of prices for most order records start with 1111, and prices for a small fraction of order records start with 0001. However, the present invention subtly takes into consideration that, for binary codes, distribution of 0 and 1 at their end values is usually evenly distributed, whether for prices with values 1000, 90, 10, or 1 Yuan, their difference is mainly reflected in the front portion of binary codes instead of back portion, which is determined by the natural rule of binary data. Therefore, the present invention determines a data partition corresponding to data in a manner of taking binary code from back-to-front, so as to achieve balanced distribution of data, thereby avoiding oversized data volume distributed to some data partitions while undersized data volume distributed to some data partitions.

FIG. 2 shows a flowchart of a method for data processing according to some embodiment of the present invention. The flowchart shown in FIG. 2 starts at step 201, by obtaining binary code of a partition key value of data to be processed. A partition key refers to a data column or a data row by which data records are partitioned. For example, in an order information data table, there are two columns: order number and order price. When data partition is performed based on a data column "order number", the "order number" is a partition key, and value of an order number in each row of data is a partition key value. Usually a certain data column is taken as a partition key; however, in some cases a certain data row may also be taken as a partition key based on different data organization forms. A partition key may be specified by a database manager or developer, or be automatically selected by a database system based on the distribution of current data records through some predetermined rules, which is not limited by the description herein. In step 201, the key value of the partition key of the data to be processed may be obtained based on the determined partition key. In some cases, the key value of a partition key exists in a numerical format (usually decimal digit), therefore, binary code corresponding to that key value needs to be obtained in step 201. For the key value of a partition key that exists in form of a character string, it may also be converted into a binary code.

Then the flowchart shown in FIG. 2 proceeds to step 202, by determining a respective data partition according to the obtained binary code of the partition key value. A binary code corresponding to the respective data partition is the same as a code formed by taking a same number of bits as the binary code in a back-to-front order from the obtained binary code of the partition key value. Because there is a corresponding binary code for each data partition, the binary code of the partition key value may be matched to a binary code corresponding to the data partition to find a matching data partition. For example, the partition key value of some data row to be processed is 1 (decimal number), its two bit binary code is 01. There are two data partitions, A and B; the one bit binary code corresponding to data partition A is 0 and the one bit binary code corresponding to data partition B is 1. Then, in step 202, according to the manner of back-to-front matching, it is determined that a data partition for the partition key should be data partition B, because the one bit binary code of data partition B is 1, and a code formed by taking the same number of bits (i.e., one bit) from the binary code of the partition key in a back-to-front order is also 1.

Those skilled in the art will appreciated that, in case that number of bits of binary code of a partition key value of data to be processed is insufficient, a "0" may be appended at the front. For example, if the four bit binary code of data partition B is 0001, and the front of the two bit binary code, 01, of the partition key value of the data to be processed is complemented to 4 bits (i.e., two "0" are added), becoming 0001, which is the same as the binary code of data partition B.

It should be further noted that, taking bit(s) "from back to front" in the present invention merely means that a certain number of bits from a binary code are selected starting from the back (least significant digit), but does not means that the taken binary code is arranged in a reverse order. For example, if the binary code of the partition key value of the data to be processed is 1101, the two bit binary code of data partition A is 01, and the two bit binary code of data partition B is 10, the result of taking a binary code with two bits taken from 1101 in a back-to-front order is "01", rather than reversely arranged "10." Therefore, data partition A is the appropriate data partition.

Then the flowchart shown in FIG. 2 proceeds to step 203, processing the data to be processed according to the determined data partition. According to some embodiments of the present invention, the data to be processed is data to be partitioned, the step of processing the data to be processed according to the determined respective data partition comprises: distributing the data to be partitioned to the respective data partition. According to other embodiments of the present invention, wherein the data to be processed is data to be deleted, the step of processing the data to be processed according to the determined respective data partition comprises: deleting the data to be deleted from the respective data partition. Whether partitioning data or deleting partitioned data, a respective data partition can be found and data processing operation may be performed.

It can be seen from the above description to the flowchart shown in FIG. 2 that more balanced data distribution can be achieved.

Figure 3:
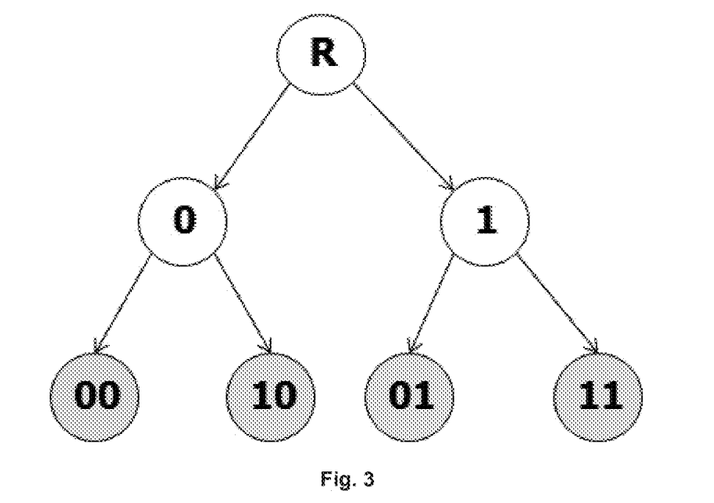
FIG. 3 shows a diagram of a binary tree according to embodiments of the present invention.

Further, according to some embodiments of the present invention, the step of determining a respective data partition is performed by using a data partition binary tree structure. A data partition binary tree is built by using binary code, wherein a leaf node of the binary tree represents a data partition, and a node other than a root node in the binary tree is assigned a binary code. Because a binary code is denoted by a 0 or a 1, this complies with feature of a binary tree—each parent node may have at most two child nodes. Taking FIG. 3 for example, R is a root node of a binary tree having two child nodes0 and 1, 0 in turn has two child nodes 00 and 10, and 1 also has two child nodes 01 and 11. The four leaf nodes 00, 10, 01, and 11 respectively represent four data partitions. According to FIG. 2, a data partition corresponding to the data to be processed may be determined using this binary tree. By way of example, if the binary code of the partition key value of the data to be processed is 10000010, because the code of the last two bits is 10, a data partition represented by the second leaf node (i.e., node 10) is the data partition corresponding to the data to be processed. By using a binary tree as shown in FIG. 3, the range of binary codes covered by a data partition may be hierarchically set as required, thereby achieving a more balanced data partition.

It should be noted that, a binary tree is used to more intuitively and visually denote the binary code based technical solution. Those skilled in the art will appreciate that explicitly drawing or providing a graph of the binary tree shown in FIG. 3 is not necessary to implement embodiments of the present invention. Information represented by graph of a binary tree may be understood, recorded, and used by a data processing system through other manners of expression.

It should also be noted that, the inventive concept does not impose any limitation on whether a left child node in a binary tree is 0 or a right child node is 0. FIG. 3 and FIGS. 4A through 4F present an illustration, and do not imply that a left child node must be 0.

According to some embodiments of the present invention, a response to a request for further splitting a data partition includes: determining a current leaf node of the binary tree corresponding to a current data partition to be split; and adding two new leaf nodes of the current leaf node by adding a one-bit binary code before the binary code of the current leaf node, wherein the two new leaf nodes correspond to two new data partitions; and redistributing data located in the current leaf node to the two new leaf nodes according to binary codes of the two new leaf nodes. Generally, when data volume in a current data partition exceeds a certain threshold, the data partition is further split to scatter data. With a data partition binary tree, if the one bit binary code of a current data partition is 1, by respectively adding 0 and 1 before 1, two new child nodes are generated (that is, 01 and 11) to be two new data partitions. The reason why 0 and 1 are respectively added before 1 rather than respectively added after 1 is because, the binary code of a data partition key value is matched to that of a data partition in a "back-to-front" order. After two new data partitions are generated, data originally located in data partition 1 may be again matched against 01 and 11, so as to be respectively distributed to data partition 01 or 11, and the original data partition 1 is cancelled (or physically, it is directly taken as one of the data partitions 01 and 11). This achieves addition of a new data partition and migration of data. It can be seen that, during the addition of a new data partition and the migration of data, data in other original data partitions will not be affected, what is needed is to re-match and migrate a portion of data in data partition 1.

According to other embodiments of the present invention, a response to a request to merging data partitions includes: determining a current leaf node of the binary tree corresponding to data partitions to be merged; and distributing data in the current leaf node to a data partition corresponding to a parent node of the current leaf node. Corresponding to adding a new data partition, if a data volume of a current data partition is reduced to be able to be merged with another data partition so as to save physical or virtual storage resources, merging a plurality of existing data partitions may be considered. Similar to the idea of adding a data partition, data in data partitions represented by child nodes having a same parent node is redistributed to a data partition corresponding to that parent node, thereby achieving merging of data partitions. It should be noted that the parent node does not correspond to any data partition (because only a leaf node represents a specific data partition); therefore, in actual operation the parent node needs to be made to correspond to an actually existing physical data partition. Furthermore, the original leaf nodes may be deleted from the binary tree, making that parent node a new leaf node.

Figure 4A:
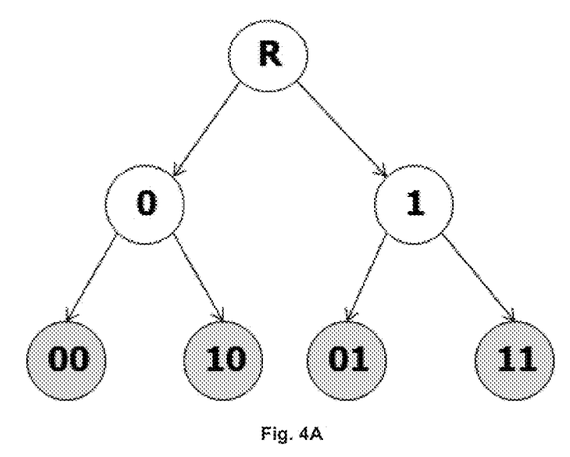
FIG. 4A shows an initialized data partition binary tree according to embodiments of the present invention.

FIGS. 4A through 4F show the processing of data by using a binary tree according to some embodiments of the present invention. FIG. 4A shows an initialized data partition binary tree. In the initialized binary tree shown in FIG. 4A, the root node is R, the left child node is represented by 0, the right child node is represented by 1, and each leaf node corresponds to one data partition. As shown in FIG. 4A, there are 4 data partitions (leaf nodes), wherein 00, 10, 01, and 11 each respectively represent one data partition.

Figure 4B:
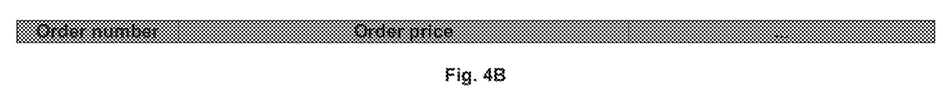
FIG. 4B shows a structure of a database table used to populate the data partition binary tree of FIG. 4A according to embodiments of the present invention.

FIG. 4B shows the structure of a database table. There are two columns in the database table, which are "order number" and "order price" respectively. To partition data records, a field distributed relatively evenly as a partition key needs to be selected, and an appropriate method to convert the value of the partition key into binary code needs to be adopted. It is assumed that the database table (wherein the column "order number" is a field with auto-increment of 1) needs to be partitioned. In view that the "order number" is an auto-incremented field and a decimal integer, the data column ("order number") may be selected as a partition key, and values therein are converted into binary code. It should be noted that, FIG. 4B illustrates one manner of selecting a partition key, and no specific limitation on what manner is used to determine a partition key is intended.

Figure 4C:
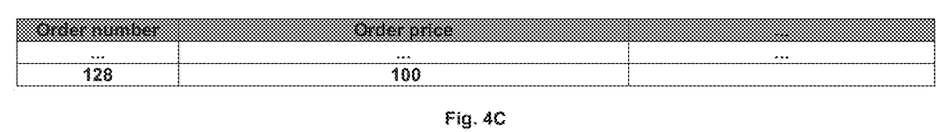
FIG. 4C shows a newly inserted data record in the database table of FIG. 4B according to embodiments of the present invention.
Figure 4D:
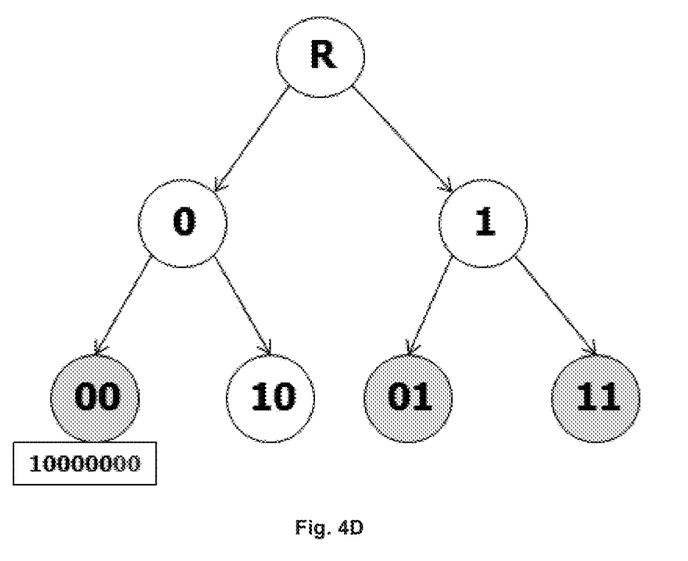
FIG. 4D shows the data partition binary tree of FIG. 4A populated with the data record of FIG. 4C according to embodiments of the present invention.

FIG. 4C shows a newly inserted data record to be partitioned. When a new data record is inserted or a data record is deleted, the partition key is first converted into a binary code, and then following operations are performed: (1) taking the last bit from the binary code; (2) if it is 0, turning to a left child of the partition binary tree; (3) if it is 1, turning to a right child of the partition binary tree; wherein, if the child node is a leaf node, that leaf node is made to correspond to a partition node, thus the partition node where data record is stored is found for that data record; if the child node is not a leaf node, one binary bit is taken from the left and return to step (2). It is assumed that a new order data record is inserted into the database table, and value of the "order number" is 128 which is a decimal integer value. The value of the "order number" 128 is first converted into a binary code, i.e. 10000000. Then the last bit in the binary code is taken, it is 0, thus turning to left child of the partition binary tree and it is found that its left child is not a leaf node; then, one more binary bit is taken from the left, it is 0, thus turning to the left child of the partition binary tree and it is found that its left child is a leaf node, so identification of a corresponding partition node is 00. That is to say, the data partition represented by the leaf node 00 is the data partition to which the data record should be distributed. FIG. 4D shows a binary tree that determines a partition into which the data record should be inserted.

Figure 4E:
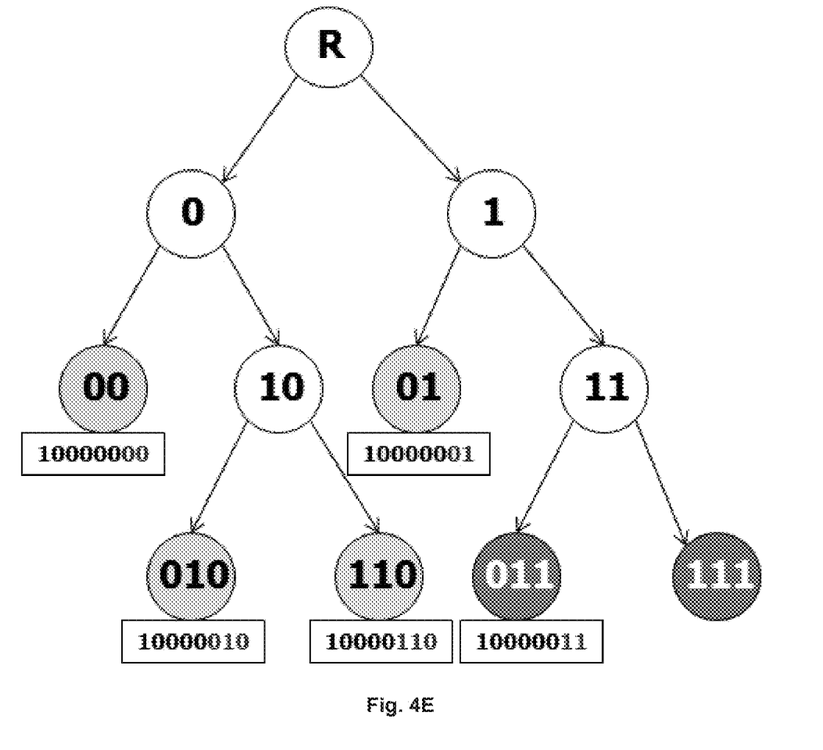
FIG. 4E shows the data partition binary tree of FIG. 4D further populated with data records from FIG. 4B according to embodiments of the present invention.

FIG. 4E shows the addition of a new data partition based on a binary tree. When workload on a certain partition node reaches a set threshold, a new partition node is added to share the workload on that partition node. Assuming that the partition node 10 reaches a set workload threshold, a left child 010 and a right child 110 are added in the partition binary tree, then identification of the old partition node is modified as 010, identification of the new partition node is modified as 110, and data records on the old partition node whose last three bits of the partition key is 110 (in binary) are moved to the partition 110. In some embodiments of the present invention, data values previously distributed to partition node 10 are redistributed. In some embodiments of the present invention, a subset of the set of data values previously distributed to partition node 10 are redistributed to partition node 010. In some embodiments of the present invention, a subset of the set of data values previously distributed to partition node 10 are redistributed to partition node 110.

Figure 4F:
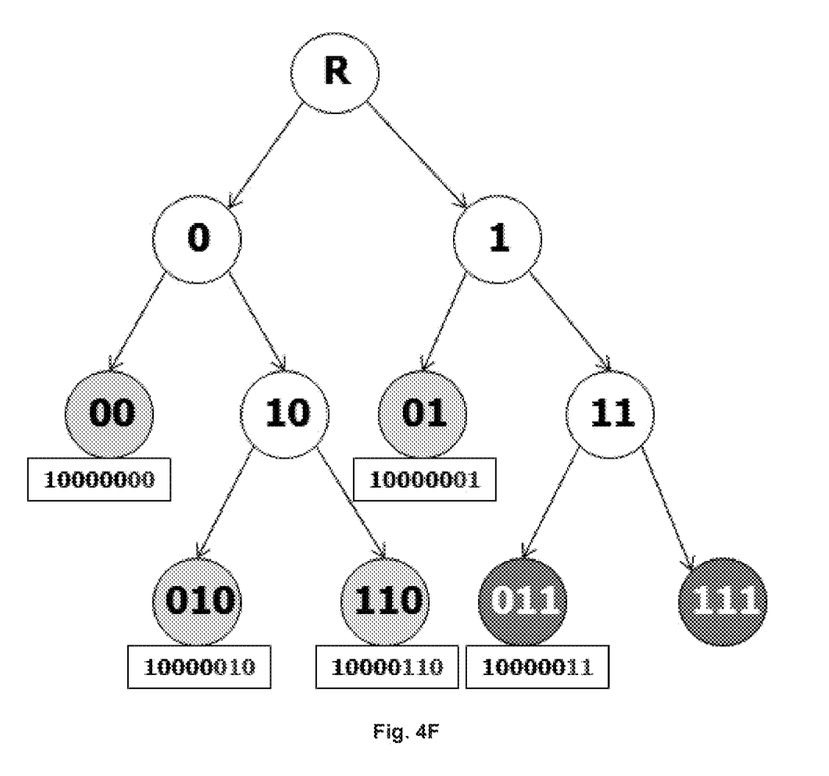
FIG. 4F shows the data partition binary tree of FIG. 4E to be modified according to embodiments of the present invention.

FIG. 4F shows merging of data partitions (represented by dark color) based on a binary tree. When workload on a certain partition node is below a set threshold, the partition node needs to be removed to save resources and reduce costs. For example, workload on the partition node 011 is below a threshold. Data on the partition node 011 is moved to the partition node 111, and identification of the partition node 111 is modified as 11, and finally nodes 011 and 111 are removed from the partition binary tree.

Figure 5:
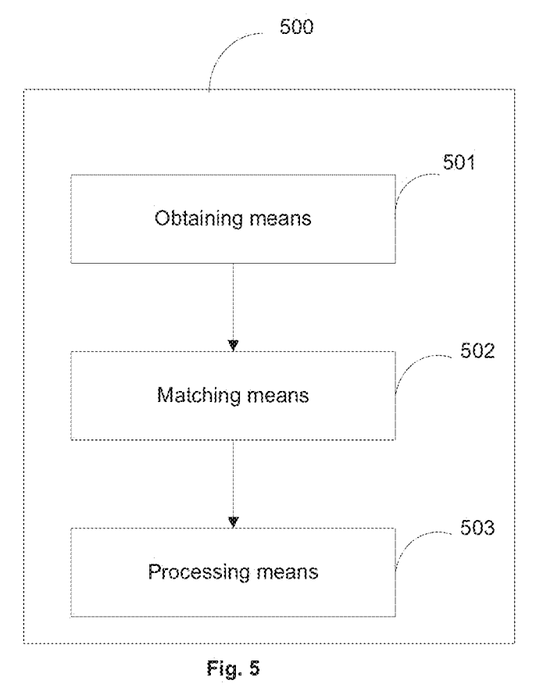
FIG. 5 shows a block diagram of a system for data processing according to embodiments of the present invention.

FIG. 5 shows a block diagram of a system for data processing according to one embodiment of the present invention. The system shown in FIG. 5 is generally denoted by system 500 comprising: an obtaining means 501 configured to obtain binary code of a partition key value of data to be processed; a matching means 502 configured to determine a respective data partition according to the obtained binary code of the partition key value, wherein a binary code corresponding to the respective data partition is the same as a code formed by taking same number of bits as the binary code in a back-to-front order from the obtained binary code of the partition key value; and a processing means 503 configured to process the data to be processed according to the determined respective data partition. It is appreciated that, in some embodiments of the present invention, means 501, 502, and 503 in system 500 respectively correspond to steps 201, 202, and 203 in the flowchart shown in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by one or more computer processors, a partition key value that (i) corresponds to a data value and (ii) is expressed in a binary format;
   determining, by the one or more computer processors, a data partition, wherein a data partition identification corresponding to the data partition correlates to the partition key value;
   determining, by the one or more computer processors, a leaf node corresponding to the data partition;
   adding, by the one or more computer processors, two child leaf nodes below the leaf node, wherein the two child leaf nodes correspond to two new data partitions respectively;
   redistributing, by the one or more computer processors, to one of the two new data partitions a subset of the set of data values previously distributed to the data partition;
   deleting, by the one or more computer processors, the subset of the set of data values from the data partition after redistribution of the data completes; and
   processing, by the one or more computer processors, the data value using the data partition.

2. The method of claim 1, wherein the processing step includes:
   responsive to a determination that a data volume of a first data partition is below a threshold, merging the first data partition with a second data partition, wherein the merging is predicted to reduce usage of one or both of physical and virtual storage resources.

3. The method of claim 1, wherein one or more of (i) the partition key value is determined by taking digits of the data value in a back-to-front manner; (ii) the data partition identification is expressed in a binary format; (iii) at least the determining step is performed by computer software running on computer hardware; (iv) generating unique identifications corresponding to each of the two child leaf nodes by appending values to the data partition identification.

4. The method of claim 1, wherein determining the data partition step uses a binary tree structure.

5. The method of claim 4, wherein (i) the binary tree structure includes a set of root nodes and a set of leaf nodes; and (ii) the set of leaf nodes represents a set of data partitions, including the data partition.

6. The method of claim 4, wherein the processing step includes:
   determining, by the one or more computer processors, two leaf nodes that are each a child of a single root node;
   redistributing, by the one or more computer processors, to a data partition corresponding to the single root node a subset of the set of data values previously distributed to two data partitions corresponding to the two leaf nodes; and
   determining, by the one or more computer processors, the data partition identification corresponding to the data partition corresponding to the single root node.

7. A computer program product, the computer program product comprising:
   one or more computer-readable storage media and program instructions stored on the one or more computer-readable storage media, the program instructions comprising:
   program instructions to receive a partition key value that (i) corresponds to a data value and (ii) is expressed in a binary format;
   program instructions to determine a data partition, wherein a data partition identification corresponding to the data partition correlates to the partition key value;
   program instructions to determine a leaf node corresponding to the data partition;
   program instructions to add two child leaf nodes below the leaf node, wherein the two child leaf nodes correspond to two new data partitions respectively;
   program instructions to redistribute to one of the two new data partitions a subset of the set of data values previously distributed to the data partition;
   program instructions to delete the subset of the set of data values from the data partition after redistribution of the data completes; and
   program instructions to process the data value using the data partition.

8. The computer program product of claim 7, wherein the program instructions to process the data value using the data partition include:
   program instructions to respond to a determination that a data volume of a first data partition is below a threshold by merging the first data partition with a second data partition, wherein the merging is predicted to reduce usage of one or both of physical and virtual storage resources.

9. The computer program product of claim 7, wherein one or more of (i) the partition key value is determined by taking digits of the data value in a back-to-front manner; (ii) the data partition identification is expressed in a binary format; (iii) at least the determining step is performed by computer software running on computer hardware; (iv) generating unique identifications corresponding to each of the two child leaf nodes by appending values to the data partition identification.

10. The computer program product of claim 7, wherein the program instructions to process the data value uses a binary tree structure.

11. The computer program product of claim 10, wherein (i) the binary tree structure includes a set of root nodes and a set of leaf nodes; and (ii) the set of leaf nodes represents a set of data partitions, including the data partition.

12. The computer program product of claim 11, wherein the program instructions to process the data value using the data partition includes:
   program instructions to determine two leaf nodes that are each a child of a single root node;
   program instructions to redistribute to a data partition corresponding to the single root node a subset of the set of data values previously distributed to two data partitions corresponding to the two leaf nodes; and
   program instructions to determine the data partition identification corresponding to the data partition corresponding to the single root node.

13. A computer system, the computer system comprising:
   one or more computer processors;
   one or more computer readable storage medium; and program instructions stored on the computer readable storage medium for execution by at least one of the one or more processors, the program instructions comprising:
- program instructions to receive a partition key value that (i) corresponds to a data value and (ii) is expressed in a binary format;
- program instructions to determine a data partition, wherein a data partition identification corresponding to the data partition correlates to the partition key value;
- program instructions to determine a leaf node corresponding to the data partition;
- program instructions to add two child leaf nodes below the leaf node, wherein the two child leaf nodes correspond to two new data partitions respectively;
- program instructions to redistribute to one of the two new data partitions a subset of the set of data values previously distributed to the data partition;
- program instructions to delete the subset of the set of data values from the data partition after redistribution of the data completes; and
- program instructions to process the data value using the data partition.

14. The computer system of claim 13, wherein the program instructions to process the data value using the data partition include:
program instructions to respond to a determination that a data volume of a first data partition is below a threshold by merging the first data partition with a second data partition, wherein the merging is predicted to reduce usage of one or both of physical and virtual storage resources.

15. The computer system of claim 13, wherein one or more of (i) the partition key value is determined by taking digits of the data value in a back-to-front manner; (ii) the data partition identification is expressed in a binary format; (iii) at least the determining step is performed by computer software running on computer hardware; (iv) generating unique identifications corresponding to each of the two child leaf nodes by appending values to the data partition identification.

16. The computer system of claim 13, wherein the program instructions to process the data value uses a binary tree structure.

17. The computer system of claim 16, wherein (i) the binary tree structure includes a set of root nodes and a set of leaf nodes; and (ii) the set of leaf nodes represents a set of data partitions, including the data partition.

18. The computer system of claim 17, wherein the program instructions to process the data value using the data partition includes:
- program instructions to determine two leaf nodes that are each a child of a single root node;
- program instructions to redistribute to a data partition corresponding to the single root node a subset of the set of data values previously distributed to two data partitions corresponding to the two leaf nodes; and
- program instructions to determine the data partition identification corresponding to the data partition corresponding to the single root node.

* * * * *